United States Patent [19]
Overturf et al.

US006151702A

[11] Patent Number: 6,151,702
[45] Date of Patent: Nov. 21, 2000

[54] METHOD AND SYSTEM FOR AUTOMATED, INTERACTIVE TRANSLATION OF A SOFTWARE PROGRAM TO A DATA MODEL FOR INPUT TO AN INFORMATION REPOSITORY

[75] Inventors: James M. Overturf, Plano, Tex.; Cris T. Paltenghe, Northridge, Calif.

[73] Assignee: Computer Associates Think, Inc., Islandia, N.Y.

[21] Appl. No.: 08/315,745

[22] Filed: Sep. 30, 1994

[51] Int. Cl.[7] ................................................ G06F 9/44
[52] U.S. Cl. ........................................................... 717/5
[58] Field of Search .................................. 395/500, 700; 717/5, 7, 9; 707/103

[56] References Cited

U.S. PATENT DOCUMENTS

| | | | |
|---|---|---|---|
| 5,119,465 | 6/1992 | Jack et al. | 395/500 |
| 5,313,614 | 5/1994 | Goettelmann et al. | 395/500 |
| 5,488,714 | 1/1996 | Skidmore | 395/500 |
| 5,493,675 | 2/1996 | Faiman, Jr. et al. | 395/700 |
| 5,524,253 | 6/1996 | Pham et al. | 395/800 |

*Primary Examiner*—Kevin J. Teska
*Assistant Examiner*—Lonnie A. Knox
*Attorney, Agent, or Firm*—Baker Botts L.L.P.

[57] ABSTRACT

The present invention is a computer implemented method and system for translating a program (9) on a source application system in a first representation to a second representation on a target application system. The method includes the steps of generating a cross reference (27) between a first set of data items from the source application system and a second set of data items from the target application system; and translating the program (9) in the first representation on the source application system to the second representation on the target application system in accordance with the cross reference (27). The system of the present invention includes a program input mechanism (30) for extracting a first set of data items from the source application system, an information repository input mechanism (33) for accepting a second set of data items from the target application system; a cross referencing subsystem (23) for generating a cross reference (27) between the first and second sets of data items; and a translator (11) for translating user selected statements from the program in accordance with the cross reference (27).

9 Claims, 13 Drawing Sheets

METHOD AND SYSTEM FOR AUTOMATED, INTERACTIVE TRANSLATION OF A SOFTWARE PROGRAM TO A DATA MODEL FOR INPUT TO AN INFORMATION REPOSITORY

NOTICE

COPYRIGHT© 1994 TEXAS INSTRUMENTS INCORPORATED

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD OF THE INVENTION

The present invention relates to an automated, interactive system and method for translating a software program on a source application system to a data model for input to a target application system which includes an information repository.

BACKGROUND OF THE INVENTION

A key project in data administration is extraction and translation of data from one software and hardware system architecture to another. Usually the previous, or legacy, system programs and data are stored as third or fourth generation language applications, i.e. COBOL, which include some form of relational database, i.e. CICS. In the volatile environment in which businesses operate in today, these legacy systems are quickly converted to much higher level languages, i.e. Action Diagram Language, which includes data item represented as data models stored in an Information Repository. The newer systems are categorized as Computer Aided System Engineering (CASE) tools and integrate program generation and information storage with a user graphical friendly interface. The information repository, or encyclopedia, associated with a CASE tool integrates the storage of data including program files, graphs, diagrams and data structures. One such CASE tool is the Information Engineering Facility (IEF), a product of the assignee, Texas Instruments, Inc.

Toolsets provided by the IEF include Current System Analysis (CSA) and Current System Modification (CSM). The CSA is a tool for performing system wide analysis on COBOL systems and for performing inventory impact and "where used" and "how used" reporting on data items within the COBOL system. The CSM is a tool for modifying COBOL systems.

Currently the CSA tool uses an Encyclopedia Import Facility (ENCI) to capture legacy system information as data models for input to the Information Repository included in the IEF. These data models may include program code and diagrams. The only diagrams currently supported by the ENCI are entity relationship diagrams (ERD), activity hierarchy diagrams (AHD), dialog flow diagrams (DFD), and Screen Designs. All legacy systems, however, are not fully represented using one of the currently supported diagrams. Also, ENCI cannot be extended from batch oriented processing to on-line processing as required, for example, for interactively creating the data models from the legacy system code. Furthermore, the use of ENCI occurs early in the re-engineering project, during initial analysis of the legacy system. As the analysis continues, however, inconsistencies are found which require additional, unanticipated changes to the Information Repository which may affect previous translation results. Also, ENCI merely builds new data models to import to the Information Repository. If the data already exists or corresponds with data already in the Information Repository, then the ENCI generates data redundancy problems which must be addressed later.

Thus, what is needed is an automated, interactive translation tool to capture business rules and data items embedded in source, legacy, application system program logic, i.e. COBOL, cross reference the source system data items with data items on a target application system, then translate the extracted business rules and data items to an equivalent target application system representation in accordance with the cross reference for input to an Information Repository.

SUMMARY OF THE INVENTION

The present invention is a computer implemented method and system for capturing business rules and data embedded in source, legacy, application system programming logic and generating data models for input to an Information Repository.

One embodiment of the method of the present invention includes the steps of generating a cross reference between a first set of data items from a source application system and a second set of data items from a target application system and translating a program in a first representation on the source application system to a second representation on a target application system in accordance with the cross referencing data.

One embodiment of the system of the present invention includes a graphical user interface through which the user controls a program input mechanism through which data items from a source application system are obtained and an information repository input mechanism through which data items from a target application system are obtained. The first and second set of data items are cross referenced by the user using a cross referencing system and the resulting cross referencing data is used to translate selected portions of an application program in a first representation on a source application system to a second representation on a target application system.

BRIEF DESCRIPTION OF THE DRAWINGS

For a better understanding of the present invention, reference may be made to the accompanying drawings, in which.

DETAILED DESCRIPTION OF THE INVENTION

In general, the system and method of the present invention translates a program in a first representation on a source application system to a second representation on a target application system in accordance with a cross reference generated between a first set of data items from the source application system and a second set of data items from the target application system.

Figure 1:
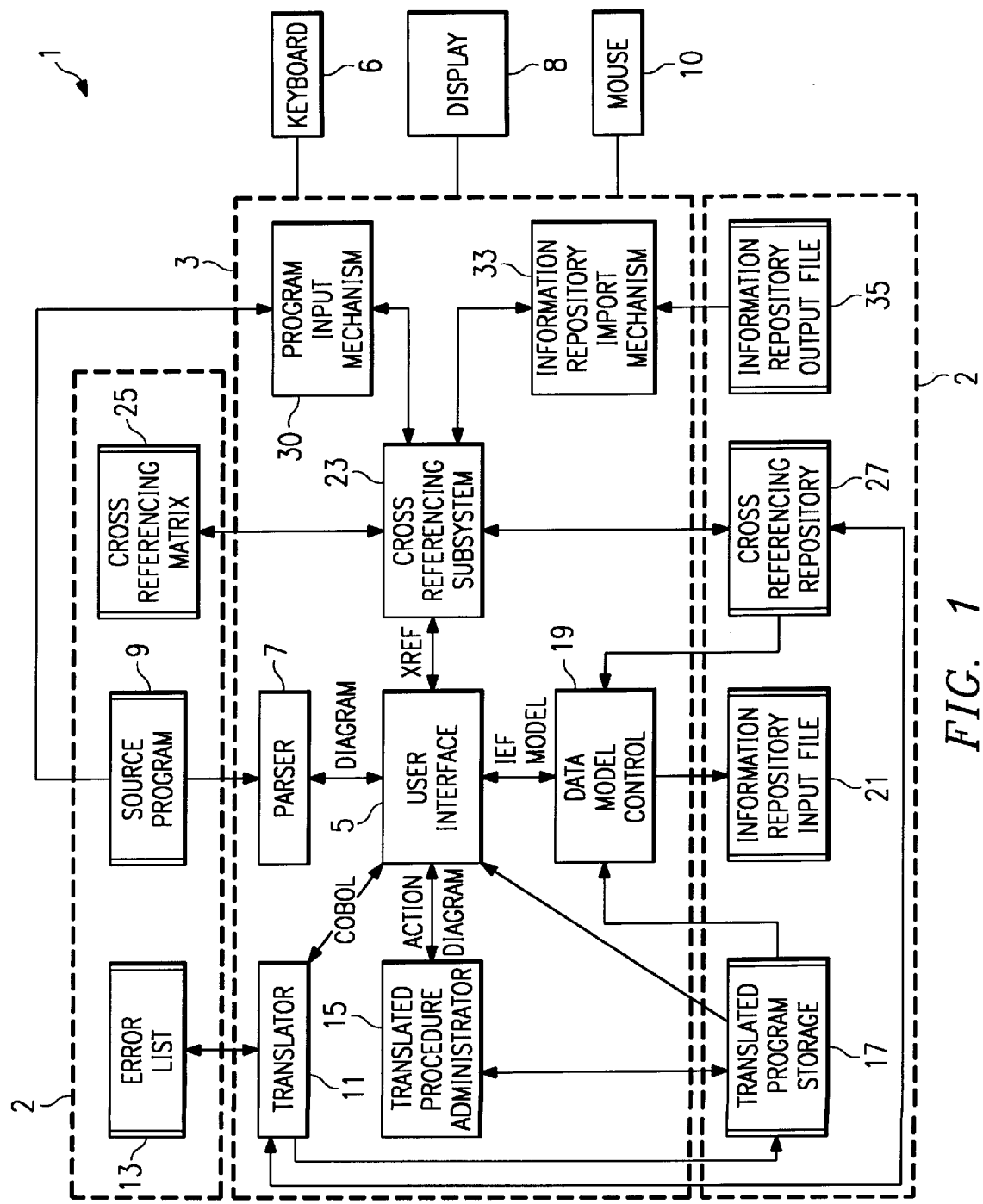
FIG. 1 is a block diagram depicting one embodiment of the present invention.

FIG. 1 illustrates one embodiment of the system of the present invention. The system is implemented using a general purpose digital computer which includes data storage 2, a processor 3, data entry means, such as a keyboard 6, a display 8, and pointing means, such as a mouse 10.

In the data storage 2 are the various data stores used in the system and method of the present invention. The various data stores include a source program 9 which contains the source, or legacy, application system code to be translated. In this embodiment of the system and method of the present invention, the source program 9 is written in COBOL which, along with its corresponding data items, is translated to data models in Action Diagram language for input to an Information Repository, not shown.

The first set of data items which are from the source application system are retrieved in one of several ways. One way is by user input through program input mechanism 30. The first set of data items can also be obtained using parser 7. The parser 7 reads the file definition section of the COBOL source program 9 and generates Action Diagram language statements to create the necessary entities (files) and attributes (including group level and item level data items). As an example, assume the following code is included in the file definition section of the COBOL source program file 9:

```
01  INVOICE-HEADER.
    05  INVOICE-NUMBER      PIC 9(6).
    05  INVOICE-CUSTOMER    PIC 9(8).
    05  INVOICE-DATE        PIC 9(8).
01  CUSTOMER-RECORD.
    05  CUSTOMER-NUMBER     PIC 9(8).
    05  CUSTOMER-NAME       PIC X(30).
    05  CUSTOMER-TYPE       PIC X(03).
    05  CUSTOMER-ADDRESS.
        10  CUSTOMER-STREET  PIC X(30).
        10  CUSTOMER-CITY    PIC X(30).
        10  CUSTOMER-STATE   PIC X(02).
        10  CUSTOMER-ZIP     PIC 9(01).
```

Through the parser 7 the COBOL data items are isolated and extracted from the source program 9 and the resulting Action Diagram language statements generated include the following statements:

record:=CobolDataGroup new name:'CUSTOMER-RECORD'.

entity:=record createEntity.

item:=CobolDataItem new name:'CUSTOMER-NUMBER'.

record add: item.

item:=CobolDataItem new name: 'CUSTOMER-NAME'.

record add: item.

This embodiment of the present invention is implemented using VisualWorks Smalltalk, a product of ParcPlace Systems. The parser 7 is generated and interfaced to Smalltalk using Yet Another Compiler Compiler (YACC), a product of MKS Industries, Inc.

A second data store, Information Repository Output file 35, includes data describing the second set of data items, entities and attributes from the Information Repository. The data in the Information Repository Output file 35 is input to the system and method of the present invention through Information Repository Input Mechanism 33. The user may also manually enter and edit the data items from the target application system through the Information Repository Input Mechanism 33.

The first set of data items from the source application system and the second set of data items from the target application system are then provided to a cross referencing subsystem 23. Through the cross referencing subsystem 23, the user cross references a source application system data item to a target application system data item using a cross referencing matrix 25. The cross referencing matrix 25 is a non-persistent data store which is used to graphically show the associations between the source application data items and the target application data items. The resulting Cross Reference data is stored persistently in cross referencing repository 27. The user may also edit cross reference data through cross referencing subsystem 23. Through the cross referencing subsystem 23 the user may also resolve many-to-many relationships among the data items of the target application system which would create an ambiguous situation during program 9 translation and generate entries in the error list 13. The cross referencing data stored in the Cross Referencing Repository 27 is stored using standard Smalltalk fileout methods for objects.

Once the data items of the source and target application systems are cross referenced, the user initiates and controls the translation of statements in the source program 9 using translator 11. The translator 11 translates user selected statements from the source program 9 using the cross referencing data stored in the cross referencing repository 27. Any errors or ambiguities encountered during the translation process result in entries to the error list 13. Any errors or problems which result in entries to the error list 13 are resolved interactively by the user, discussed infra. In the case of unknown data items, one of the error resolution options generated includes the creation of a new data item for input to the cross referencing matrix 25. The additional source application system data items added to the cross referencing matrix 25 may be cross referenced to target application system data items before further translation continues. The error list 13 and the cross referencing matrix 25 are non-persistent data stores.

In this embodiment of the present invention, the translator 11 translates portions of the source program 9 to Action Diagrams which are stored in translated program storage 17. Additional editing and maintenance of Action Diagrams stored in translated program storage 17 is performed through translated procedure administrator 15.

Using the Action Diagrams stored in the translated program storage 17 and the cross referencing data in the cross referencing repository 27, data model control 19 generates an information repository input file 21 which contains the resulting data models for input to the Information Repository. Translated program storage 17 is a non-persistent data store.

Figure 2:
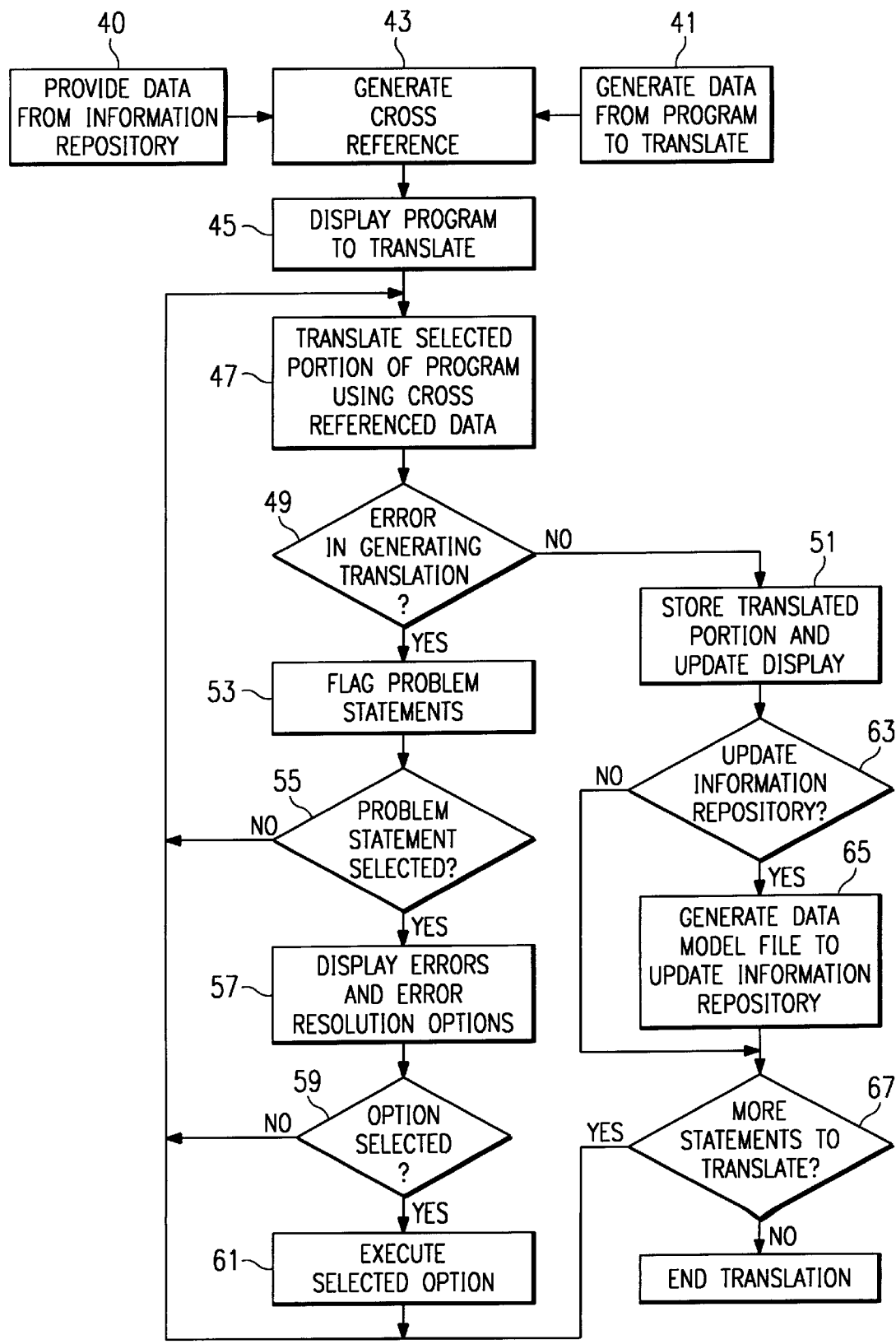
FIG. 2 is a flowchart illustrating the general operation of the present invention.

FIG. 2 illustrates an operational flowchart according to one embodiment of the present invention. Data items from the source application system are generated in block 41. Data items from the target application system are provided in block 40. The data items from the source application system and from the target application system are cross referenced in block 43. The source program 9 is displayed at block 45. A user selected portion of the source program 9 is then translated at block 47 using the cross referencing data generated at block 43. The translation process at block 47 may also result in additional source application system data items being added to the cross reference generated at block 43.

At decision block 49, if no errors were encountered in generating the translation, the translation of the selected portion of the source program 9 is stored in translated program storage 17 and the resulting Action Diagram statements are displayed. If the user chooses, at decision block 63 to update the information repository, control flows to block 65 where a information repository input file 21 is generated to update the information repository. Otherwise, control flows from decision block 63 to decision block 67. If there are no more statements to translate at decision block 67, then the translation ends. Otherwise, control flows to block 47.

If errors were encountered, at decision block 49, during the translation of the selected portion of the source program 9, the problem statements are flagged at block 53. The user may then select a flagged statement to see the corresponding errors. If, at decision block 55, a flagged statement is selected, the corresponding errors are displayed at block 57 along with user selectable options to resolve the errors. If an option is selected by the user at decision block 59, the selected option is executed at block 61 and control returns to block 47.

These and other functions performed using the system and method of the present invention are better understood by reviewing the user interface 5. One embodiment of the user interface 5 of the present invention is presented in detail in the following sections. The present embodiment of the user interface 5 is implemented using VisualWorks Smalltalk by ParcPlace Systems. Each of the following sections begin with the window name then describes the basic functionality accessible from the window including a description of the menus, fields and buttons associated with the window. Each menu generally includes one or more menu items selectable by the user to perform the associated menu function.

Each field generally includes either a single value or multiple values, usually in the form of a list box, each of which may also be selectable by the user, depending on the associated functionality. Single value fields generally require data entry by the user from the keyboard 6. A single value may also be selected from the list box associated with a multiple value field using the mouse 10. The buttons on each of the windows described below are also selectable by the user to perform the associated button function. Menu items and buttons are selectable in one of several ways which include using the mouse 10 or by using the keyboard 6 to simultaneously activate an ALT key and a key corresponding to the letter underlined in the particular menu item or button description.

COB2AD

Figure 3:
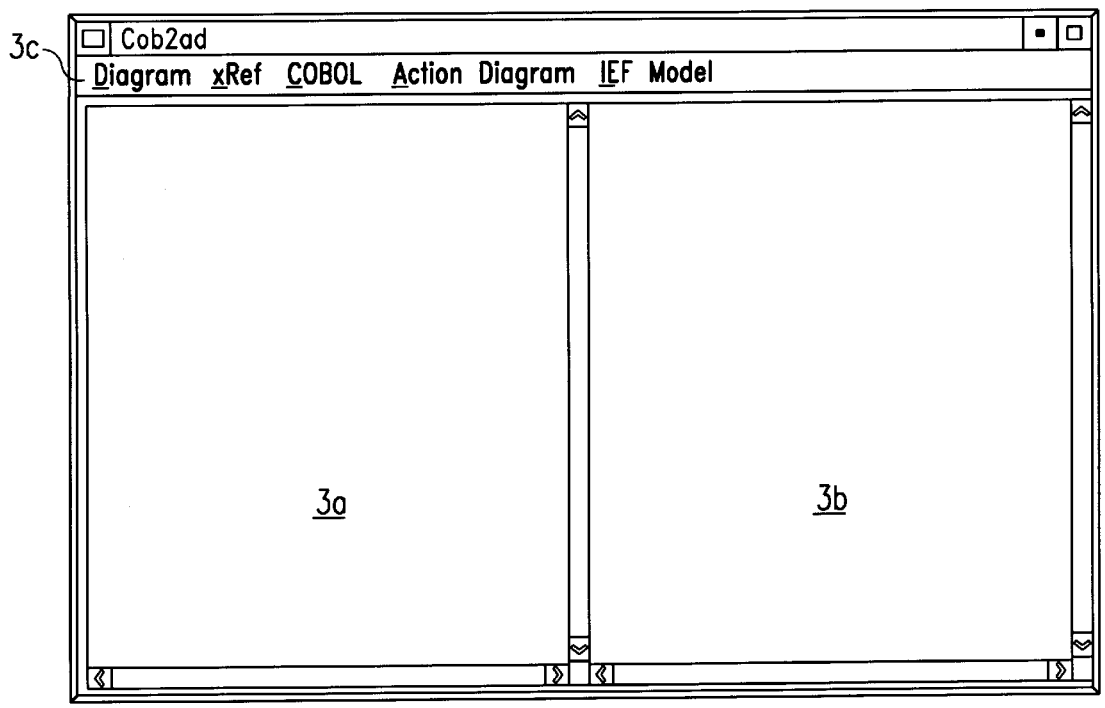
FIG. 3 illustrates the COB2AD window of one embodiment of the user interface of the present invention.
Figure 4A:
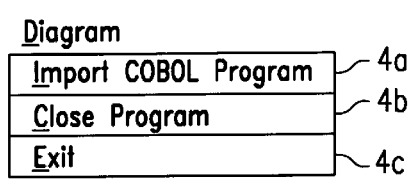
FIGS. 4A–4D illustrate the drop down menus associated with the COB2AD window of FIG. 3 of one embodiment of the user interface of the present invention.
Figure 4C:
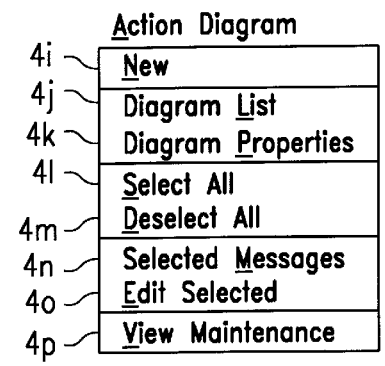
Figure 4B:
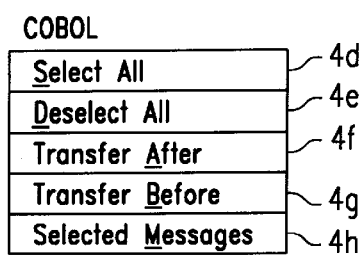

The COB2AD window is shown in FIG. 3. The associated drop down menus, indicated in menu panel 3c, are shown in FIGS. 4A–4C. The COB2AD window, FIG. 3, is the primary user interface screen. From the COB2AD window, FIG. 3, the user conducts all statement translations and initiates all Cross Referencing and Cross Reference editing. As shown in FIG. 3, the COB2AD window includes two panes, a COBOL pane 3a and an Action pane 3b. The COBOL pane 3a includes a textual representation of statements from the source program 9 of the source application system. The user selects statements to translate from the COBOL pane 3a. The Action pane 3b includes graphics and text resulting from the translation of the selected statements in the COBOL pane 3a. The translator 11 translates the selected COBOL statements into action statements on a line-by-line basis. The resulting graphics and text in the Action pane 3b are Action Diagram language representing the data model which will be sent to the target application system through the Information Repository Input File 21.

The menus included in the COB2AD window, FIG. 3, include Diagram, Cobol, Action Diagram and IEF Model as shown in the menu panel 3c.

The Diagram menu, illustrated in FIG. 4A, includes the menu items "Import COBOL Program" 4a, "Close Program" 4b and "Exit" 4c. Selection of the menu item "Import COBOL Program" 4a initiates the parser 7 which parses the COBOL source program 9 into the COB2AD window, FIG. 3. Selection of the source program 9 is done through a File Browser window, shown in FIG. 18. The menu item "Close Program" 4b closes the currently opened COBOL program 9 and clears the COBOL pane 3a. Selection of the menu item "Exit" 4c ends execution of the present invention after an appropriate warning message.

The COBOL menu, shown in FIG. 4B, includes the menu items "Select All" 4d, "Deselect All" 4e, "Transfer After" 4f, "Transfer Before" 4g, and "Selected Messages" 4h. The menu items "Select All" 4d and "Deselect All" 4e allow the user to select and deselect, respectively, all statements in the COBOL pane 3a.

The menu items "Transfer After" 4f and "Transfer Before" 4g control the actual language translation. The user must first select the desired COBOL statements to translate in the COBOL pane 3a then select a statement in the Action Diagram in the Action pane 3b for a location. "Transfer After" 4f will generate the new Action Diagram statement or statements after the selected statement and "Transfer Before") 4g will initiate translation of the selected COBOL statement or statements and place the translation before the selected statement. If no statement is highlighted in the Action pane 3b, the results are appended to the end of the Action Diagram if "Transfer After" 4f is selected and are appended at the beginning of the Action Diagram if "Transfer Before" 4g is selected.

If the statements selected in the COBOL pane 3a are not successfully translated, the corresponding statement or statements are redisplayed in red type. Additional source application system data items may also be generated as a result of the translation process and stored in the cross referencing matrix 25. The menu item "Selected Messages" 4h, discussed infra, allows the user to view error messages for selected COBOL statements that are drawn in red type after an attempted transfer. Thus, this menu item causes a flow to an Error List window shown in FIG. 19.

The Action Diagram menu, illustrated in FIG. 4C, includes the menu items "New" 4i, "Diagram List" 4j, "Diagram Properties" 4k, "Select All" 4l, "Deselect All" 4m, "Selected Messages" 4n, "Edit Selected" 4o and "View Maintenance" 4p. Selection of the menu item "New" 4i will open a new Action Diagram in the Action pane 3b. Any Action Diagram currently displayed in the Action pane 3b is stored in the Translated Program Storage 17 and added to a Diagram List window, shown in FIG. 21, causing a flow to a Diagram Properties window, shown in FIG. 23.

Figure 21:
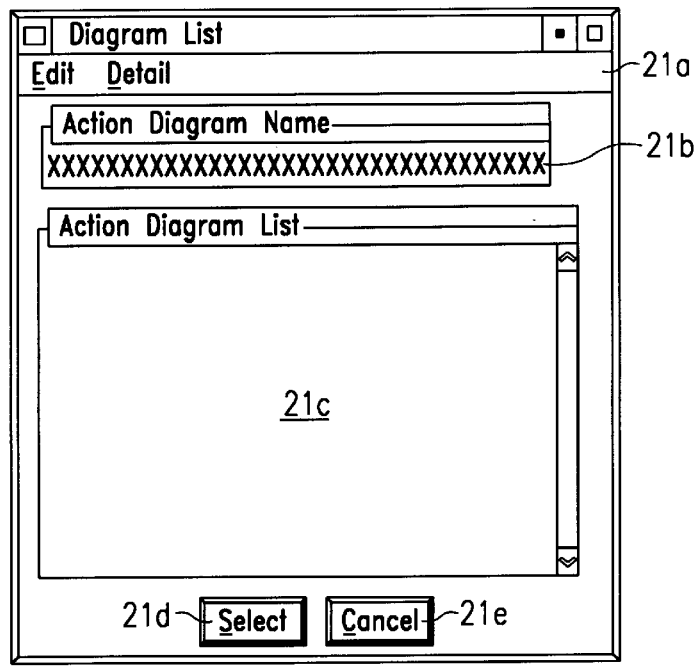
FIG. 21 depicts the Diagram List window of one embodiment of the user interface of the present invention.

Selection of the menu item "Diagram List" 4j causes a flow to the Diagram List window, FIG. 21, discussed infra.

Figure 23:
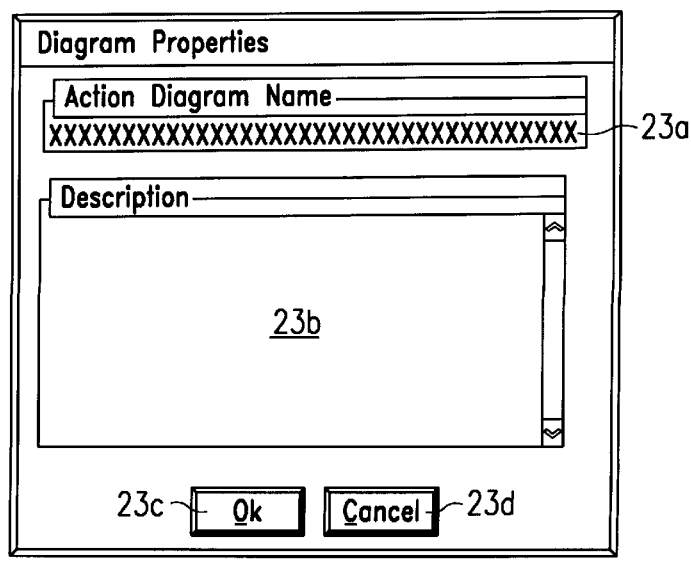
FIG. 23 illustrates the Diagram Properties window of one embodiment of the user interface of the present invention.

Selection of the menu item "Diagram Properties" 4k allows the user to update the properties of the Action Diagram currently opened in the Action pane 3b and causes a flow to the Diagram Properties window, FIG. 23.

Selection of the menu items "Select All" 4l and "Deselect All" 4m allow the user to select and deselect, respectively, all the statements in the Action Diagram displayed in the Action pane 3b of the COB2AD window, FIG. 3.

Selection of the menu item "Selected Messages" 4n allows the user to view the error messages for any Action Diagram statement in the Action pane 3b that is displayed in red type. This menu item causes a flow to the Error List window shown in FIG. 19.

Selection of the menu item "Edit Selected" 40 allows the user to edit the properties for a data item selected in an Action Diagram statement displayed in the Action pane 3b.

Figure 24:
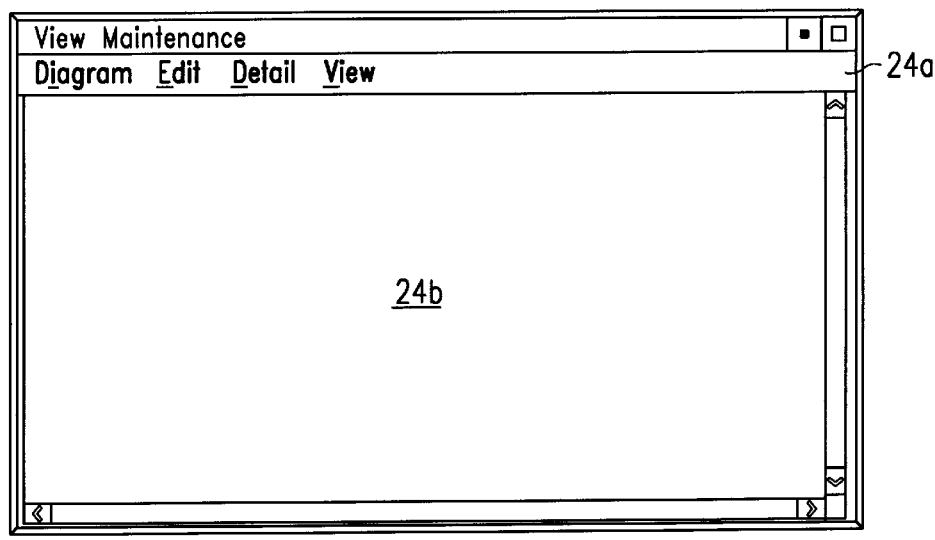
FIG. 24 shows the View Maintenance window of one embodiment of the user interface of the present invention.

The menu item "View Maintenance" 4p causes a flow to the View Maintenance window, shown in FIG. 24, when selected where the user can edit a view. A view is a variable declaration consisting of a view type, name, entity type and a set of one or more entity attributes.

The menu IEF Model, illustrated in FIG. 4C, includes the menu items "Model Properties" 4q and "Build New Model" 4r. The menu item "Model Properties" 4q allows the user to define the data model which will be generated using the Action Diagrams stored in the Translated Program Storage 17 and the Cross References stored in the Cross Referencing Repository 27. Selection of this option causes a flow to the Model Properties window shown in FIG. 28. Selection of the menu item "Build New Model" 4r generates the Information Repository Input file 21 for a data model defined using the menu item "Model Properties" 4q, which include the Action Diagrams in the Action Diagram list in the Diagram List window, FIG. 21. This option also causes a flow to the Conversion Status window shown in FIG. 29.

xRef Matrix

Figure 5:
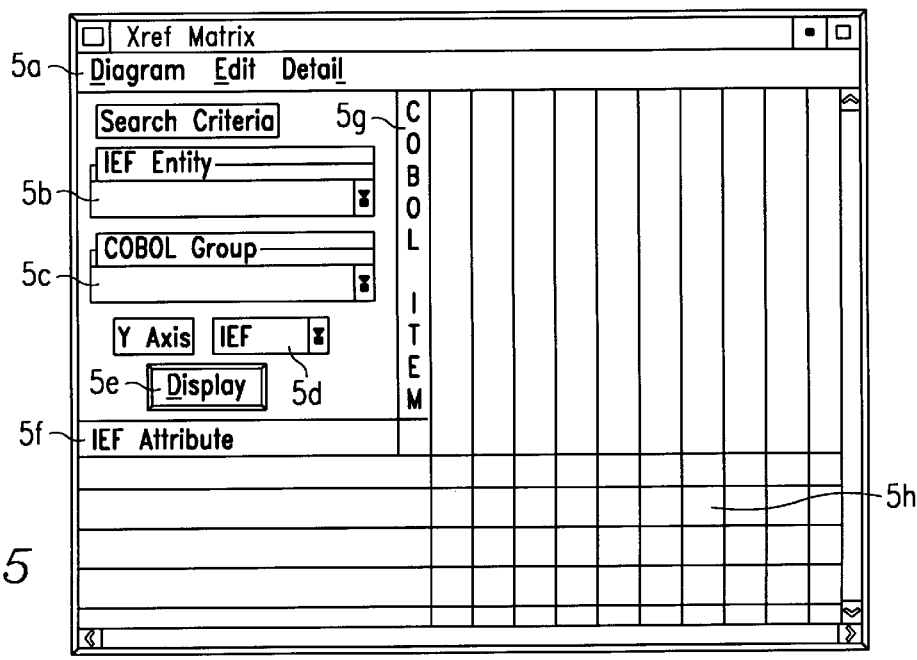
FIG. 5 shows the Cross Reference (xRef) Matrix window of one embodiment of the user interface of the present invention.
Figure 6A:
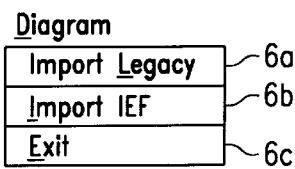
FIGS. 6A–6C depict the drop down menus associated with the xRef Matrix window of FIG. 5 of one embodiment of the user interface of the present invention.
Figure 6B:
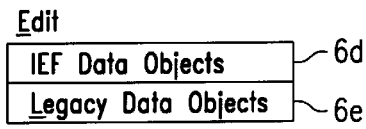
Figure 6C:
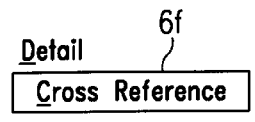

The xRef Matrix window is shown in FIG. 5. The associated drop down menus, as indicated in menu panel 5a, are shown in FIGS. 6A–6C. Using the matrix displayed in the xRef Matrix window, FIG. 5, the user will indicate Cross References between COBOL (or source) data items and IEF Attributes, the target data items. The menus included in the xRef Matrix window, FIG. 5, are Diagram, Edit and Detail as shown in menu line 5a.

The Diagram menu, illustrated in FIG. 6A, includes the menu items "Import Legacy" 6a, "Import IEF" 6b and "Exit" 6c. The menu items "Import Legacy" 6a and "Import IEF" 6b are used to import data definitions for COBOL data items and IEF Attributes, respectively, from the data files Source Program 9 and Information Repository Output File 35, respectively. Both menu items cause a flow to the File Browser window shown in FIG. 18 so that the user may select the appropriate file to import from. The specific formats for the data files Information Repository Output File 35 and Information Repository Input File 21 depend upon the target application system structure. The menu item "Exit" 6c returns the user to the COB2AD window, FIG. 3.

The Edit menu, illustrated in FIG. 6B, includes the menu items "IEF Data Objects" 6d and "Legacy Data Objects" 6e. These menu items cause program control to flow to the IEF Entity List window, shown in FIG. 8, and to the Legacy Data List window, shown in FIG. 14, respectively. Through the IEF Entity List window, FIG. 8 and the Legacy Data List window, FIG. 14, the user may edit or create the data definitions for the source application system data items and the target application system data items, respectively.

Figure 7:
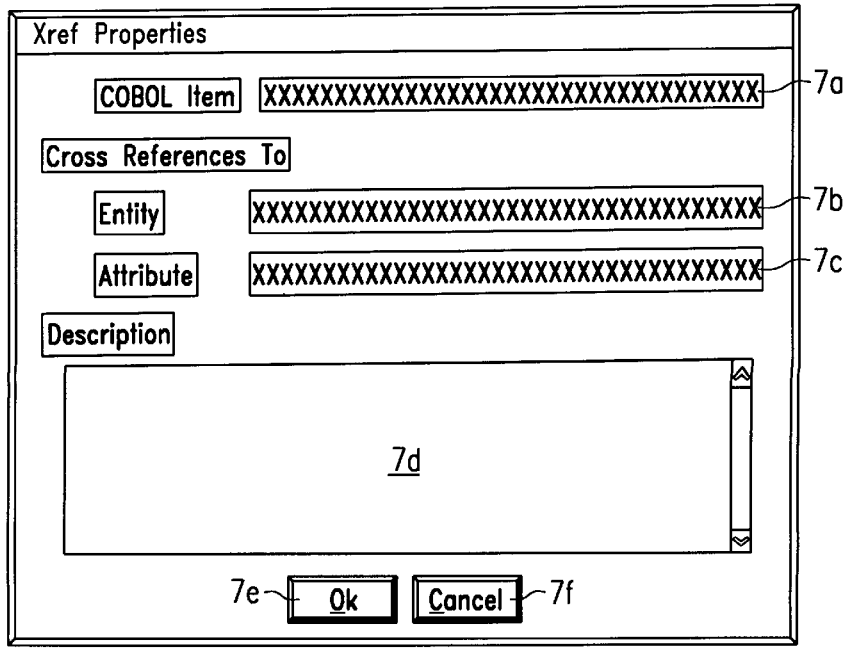
FIG. 7 illustrates the xRef Properties window of one embodiment of the user interface of the present invention.

The Detail menu, illustrated in FIG. 6C, includes the menu item "Cross Reference" 6f which allows the user to edit the Cross Reference properties and causes a flow to the xRef Properties window shown in FIG. 7.

The xRef Matrix window, FIG. 5, is both the user interface for maintaining data item Cross References and a means of documentation. The user declares search criteria using the fields "IEF Entity" 5b and "COBOL Group" 5c described hereinbelow. The user can also create and remove Cross References by double-clicking an intersection square, i.e. the intersection square at 5h, associating the two desired data items. The data is stored non-persistently using the cross referencing matrix 25. The Cross References will be stored persistently in the Cross Referencing Repository 27.

The field IEF Entity 5b is a drop down list box which displays all known IEF Entity Types. This list is populated automatically from the Information Repository Output file 35 by using the menu item "Import IEF" 6b in FIG. 6A or through user input by using the IEF Entity List window shown in FIG. 8. The field COBOL Group 5c is a drop down list box which displays all known COBOL data groups. This list is populated automatically by using the menu item "Import Legacy" 6a in FIG. 6A or through user input by using the Legacy Data List window shown in FIG. 14.

The field Y Axis 5d is also a drop down list box which includes the values "COBOL" and "IEF". Selecting "COBOL" presents a Matrix orientation with COBOL data items on the Y axis. Selecting "IEF" presents a Matrix orientation with IEF Attributes on the Y axis, the orientation currently illustrated in FIG. 5. The X axis always includes the data items (or attributes) cross referenced to the current list of attributes (or data items) on the Y axis. For example, if the Y axis is IEF, then the X axis displays all the COBOL data items this list of IEF attributes are cross referenced to.

A Display button 5e is also included in the xRef Matrix window, FIG. 5, and selection of the Display button 5e displays a matrix in accordance with the search criteria entered in the fields IEF Entity 5b and COBOL group 5c.

xRef Properties

The xRef Properties window is shown in FIG. 7. Through this window the user may edit the description of a Cross Reference between a source application system data item and a target application data item. The fields included in the xRef Properties window show in FIG. 7 include COBOL Item 7a, Entity 7b, Attribute 7c and Description 7d. The field COBOL Item 7a is a read only field which includes the data item name. The field Entity 7b is a read only field which shows the Entity Type name for the target application system data item (an IEF Attribute) being cross referenced. The field Attribute 7c is a read only field which shows the Attribute name. The field Description 7d includes a description for the cross reference.

Also included in the xRef Properties window in FIG. 7 are an OK button 7e and a Cancel button 7f. Selection of the OK button 7e returns control flow the xRef Matrix window shown in FIG. 5, saving any changes made. Selection of the Cancel button also returns control to the xRef Matrix window shown in FIG. 5 but without saving any changes.

IEF Entity List

Figure 8:
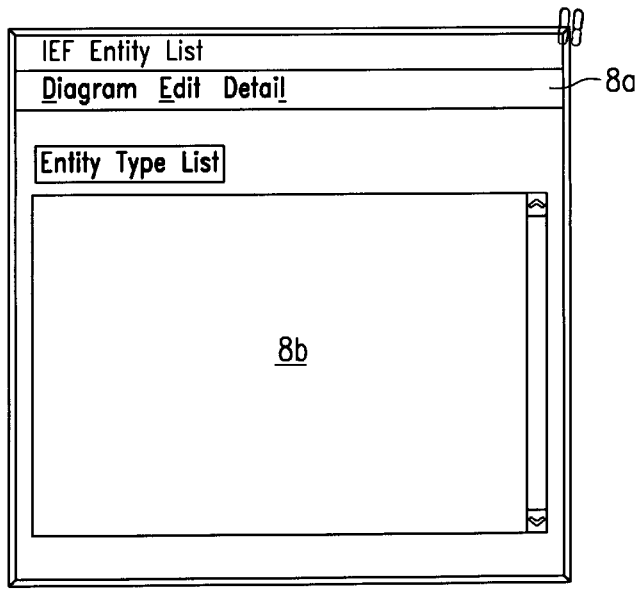
FIG. 8 shows the IEF Entity List window of one embodiment of the user interface of the present invention.

The IEF Entity List window is shown in FIG. 8 and the associated drop down menus are shown in FIG. 9. The IEF Entity List window in FIG. 8 is used for viewing and editing a list of IEF Entity Types. The menus associated with the IEF Entity List window shown in FIG. 8, as shown in menu panel 8a, include Diagram, Edit and Detail.

Figure 9A:
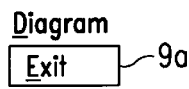
FIGS. 9A–9C show the drop down menus associated with the IEF Entity List window of FIG. 8 of one embodiment of the user interface of the present invention.

The menu Diagram, illustrated in FIG. 9A, includes the menu item "Exit" 9a selection of which returns control to the calling program.

Figure 9B:
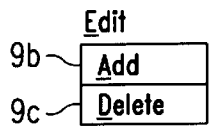

The Edit menu, shown in FIG. 9B, includes the menu items "Add" 9b and "Delete" 9c. The menu item "Add" 9b allows the user to manually add entities to the IEF Entity list. This option causes a flow to the Entity Properties window shown in FIG. 10. The menu item "Delete" 9c will delete a selected Entity and its associated Attributes.

Figure 9C:
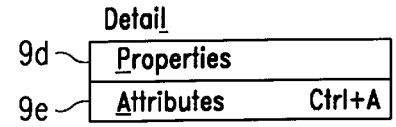

The Detail menu, shown in FIG. 9C, includes the menu items "Properties" 9d and "Attribute" 9e. The menu item "Properties" 9d allows the user to edit the properties of a selected Entity. This option causes a flow to the Entity Properties window shown in FIG. 10. Selection of the menu item "Attributes" 9e causes a flow to the IEF Attribute List window shown in FIG. 11.

The field Entity Type List 8b is also included in the IEF Entity List window shown in FIG. 8. This field is a read only list box which includes a list of all known Entities from which the user may select Entities one at a time.

Entity Properties

Figure 10:
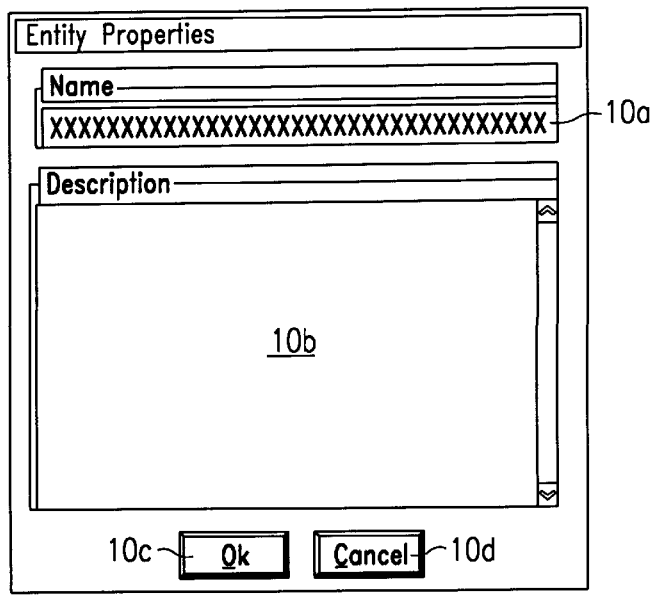
FIG. 10 illustrates the Entity Properties window of one embodiment of the user interface of the present invention.

The Entity Properties window is shown in FIG. 10. This window allows the user to edit the properties of an IEF Entity. The fields included in the Entity Properties window show in FIG. 10 include Name 10a and Description 10b. The Name field 10a includes the name of the Entity. All Entity names must be unique and no more than 32 characters in length. The field Description 10b includes a free-form description of the Entity. The description can be no more than 1980 characters. An OK button 10c and a Cancel button 10d are also included in the Entity Properties window shown in FIG. 10. Selection of the OK button 10c returns control to the IEF Entity List window shown in FIG. 8. Any inputs or changes are accepted. Selection of the Cancel button 10d also returns control to the IEF Entity List window shown in FIG. 8 but without accepting any inputs or changes. When creating a new Entity, this button also cancels the creation.

IEF Attribute List

Figure 11:
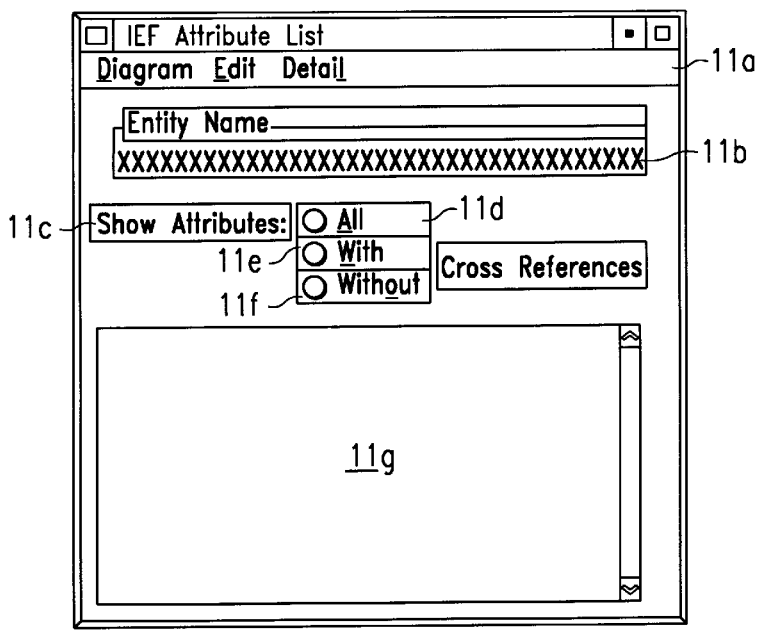
FIG. 11 depicts the IEF Attribute List window of one embodiment of the user interface of the present invention.

The IEF Attribute List window is shown in FIG. 11 and the associated drop down menus are shown in FIG. 12. The IEF Attribute List window shown in FIG. 11 allows the user to create and edit Attributes for an Entity selected from the IEF Entity List window in FIG. 8. The IEF Attribute List window in FIG. 11 includes the menus Diagram, Edit and Detail as shown in the menu panel 11a.

Figure 12A:
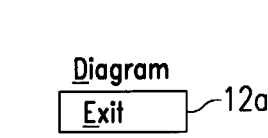
FIGS. 12A–12C show the drop down menus associated with the IEF Attribute List window of FIG. 11 of one embodiment of the user interface of the present invention.

The Diagram menu, illustrated in FIG. 12A, includes the menu item "Exit" 12a which returns control to the IEF Entity List window in FIG. 8.

Figure 12B:
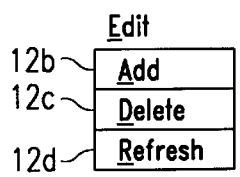

The Edit menu, shown in FIG. 12B, includes the menu items "Add" 12b, "Delete" 12c and "Refresh" 12c. The menu item "Add" 12b allows the user to add a new attribute to the list. This options causes a flow to the Attribute Properties window in FIG. 13. The menu item "Delete" 12c allows the user to remove attributes from the list. All Cross References to the deleted Attribute are also deleted. The menu item "Refresh" 12c will redisplay the Attribute list. This is used in conjunction with a "With" Cross References button 11e and a "Without" Cross References button 1f discussed below.

Figure 12C:
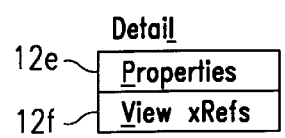

The Detail menu, illustrated in FIG. 12C, includes the menu items "Properties" 12e and "View xRefs" 12f. The menu item "Properties" 12e allows the user to edit the properties of a selected Attribute. Selection of this menu item causes a flow to the Attribute Properties window shown in FIG. 13. The menu item "View xRefs" 12f causes a flow to the xRef Properties window shown in FIG. 7.

The fields includes in the IEF Attributes List window shown in FIG. 11 include Entity Name 11b and Show Attributes 11c. The field Entity Name 11b is a read-only field which displays the Entity Name defined by the listed attributes. The field Show Attributes 11c, with associated Radio buttons "All" 11d, "With" 11e and "Without" 11f, allows the user to specify a search criteria on the Attribute list based on Cross References. The user will have to select the menu item "Refresh" 12c to redisplay the list. The list box 11g below the Radio buttons 11d–11f will display all the Attributes qualifying for the search criteria.

Attribute Properties

Figure 13:
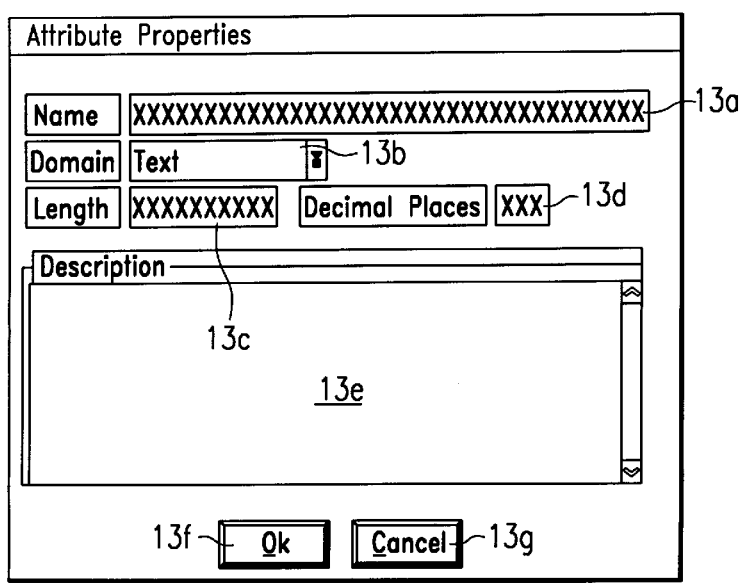
FIG. 13 illustrates the Attribute Properties window of one embodiment of the user interface of the present invention.

The Attribute Properties window is shown in FIG. 13. This window allows the user to edit the properties of a selected Attribute. The fields included in the Attribute Properties window include Name 13a, Domain 13b, Length 13c, Decimal Places 13d and Description 13e. The field Name 13a includes the name of the selected Attribute. The name must be unique within a given Entity and cannot exceed 32 characters in length. The field Domain 13b is a drop down list box which includes all valid IEF domain types. The valid IEF domain types include Date, Time, Number and Character. The field Length 13c includes the length of the selected Attribute for all Domain types (except Time and Date which have fixed sizes). The field Decimal Places 13d includes the number of decimal places in the selected Attribute if the Domain type of the selected Attribute is Number. The field Description 13e includes a free-form description of the selected Attribute. The description can be no more than 1980 characters long.

The buttons included in the Attribute Properties window of FIG. 13 are an OK button 13f and a Cancel button 13g. Selection of the OK button 13f returns control to the IEF Attribute List window, FIG. 11. Any changes to the properties of the selected Attribute are saved. Selection of the Cancel button 13g also returns control to the IEF Attribute List window, FIG. 11, but, any changes made to the properties of the selected Attribute are not saved. If creating a new Attribute, the creation is cancelled.

Legacy Data List

Figure 14:
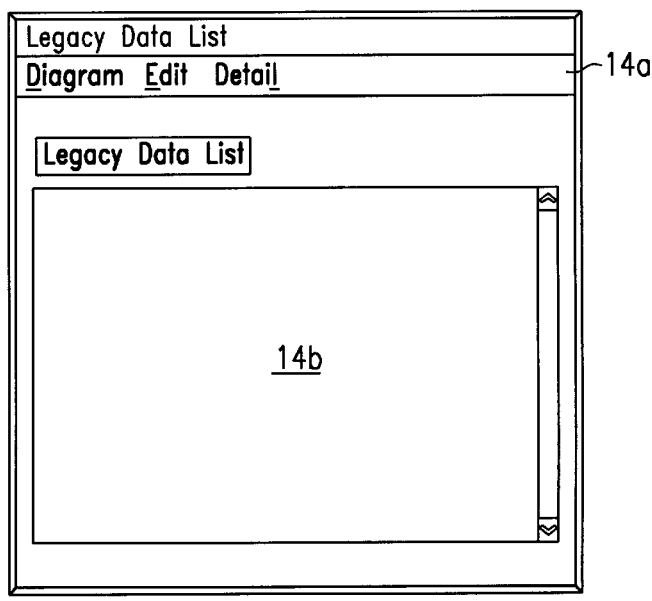
FIG. 14 illustrates the Legacy Data List window of one embodiment of the user interface of the present invention.

The Legacy Data List window is shown in FIG. 14 and the associated menus are in FIG. 15. This window allows the user to view and edit all COBOL data definitions. Included in the Legacy Data List window, FIG. 14, are the menus Diagram, Edit and Detail as shown in the menu panel 14a.

Figure 15A:
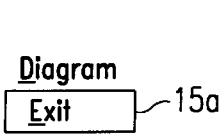
FIGS. 15A–15C show the drop down menus associated with the Legacy Data List window of one embodiment of the user interface of the present invention.

The Diagram menu, illustrated in FIG. 15A, includes the menu item "Exit" 15a which returns control to the calling program.

Figure 15B:
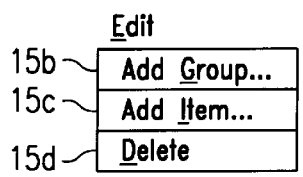

The Edit menu, shown in FIG. 15B, include the menu items "Add Group" 15b, "Add Item" 15c and "Delete" 15d. The menu item "Add Group" 15b allows the user to create new Group items. This menu item causes a flow to the COBOL Group Properties window in FIG. 16. The menu item "Add Item" 15c creates a new COBOL data item. Selection of this menu item causes a flow to the COBOL Data Item Properties window, illustrated in FIG. 17. Selection of the menu item "Delete" 15d will delete the selected data or group item. If a group is selected, all of its children and all associated cross references are also deleted.

Figure 15C:
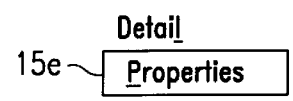
Figure 16:
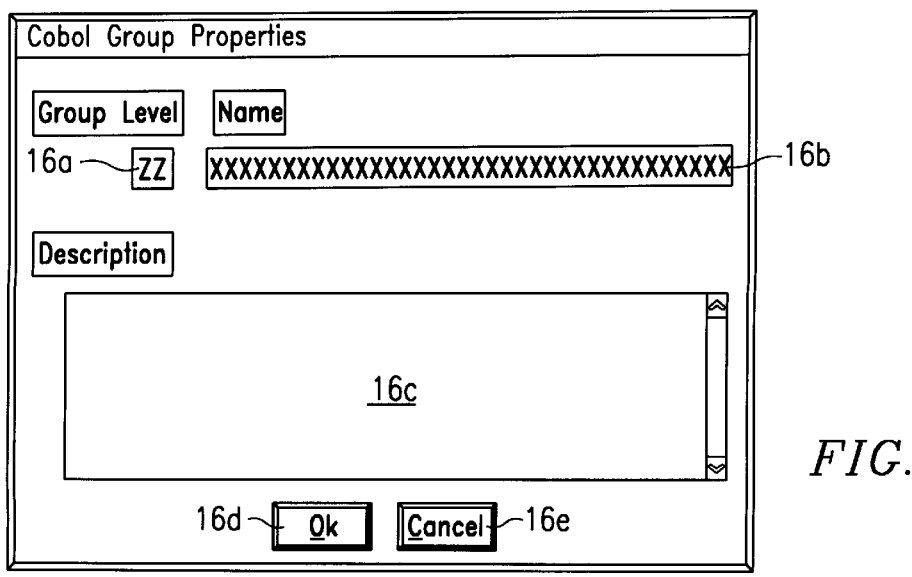
FIG. 16 shows the Cobol Group Properties window of one embodiment of the user interface of the present invention.
Figure 17:
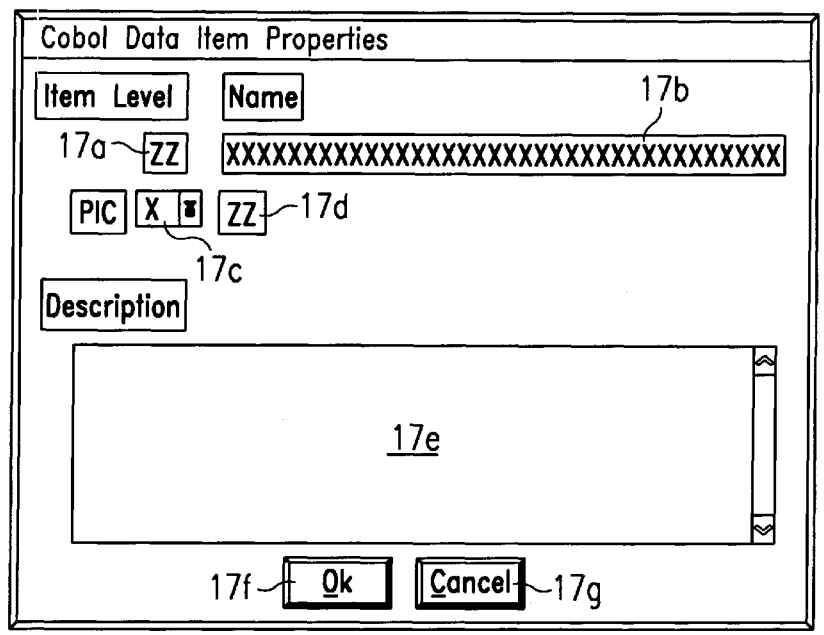
FIG. 17 shows the Cobol Data Item Properties window of one embodiment of the user interface of the present invention.

The Detail menu, shown in FIG. 15C, includes the menu item "Properties" 15e which causes a flow to either the COBOL Group Properties window, FIG. 16, or the COBOL Data Item Properties window, FIG. 17, depending on the type of object selected. Selection of this menu item allows the user to edit COBOL data definitions.

The field Legacy Data List 14b, also included in the Legacy Data List window of FIG. 15, is a read only list box which includes the list of all known COBOL data definitions. The user can select the items individually. The display will be in standard COBOL format.

COBOL Group Properties

The COBOL Group Properties window is shown in FIG. 16. Through this window the user can edit Group item properties. The window is basically a template for COBOL data definitions. The fields included in the COBOL Group Properties window include Group Level 16a, Name 16b and Description 16c. The field Group Level 16a includes the COBOL group level number. The field Name 16b holds the name for the Group item. The field Description 16c holds a description for the Group definition. The buttons included in the COBOL Group Properties window, FIG. 16, include an OK button 16d and a Cancel button 16e. The OK button 16d returns control to the Legacy Data List window, FIG. 14. All changes are saved. The Cancel button 16e also returns control to the Legacy Data List window, FIG. 14, but, changes are not saved. If creating a new Group, the creation is cancelled.

COBOL Data Item Properties

The COBOL Data Item Properties window is shown in FIG. 17. This window allows the user to edit properties for a COBOL data item. This window is basically a template for the data definition of the data item. The fields included in the COBOL Data Item Properties window, FIG. 17, include Item Level 17a, Name 17b, PIC 17c, PIC Length 17d and Description 17e. The field Item Level 17a includes the COBOL level number associated with the data item. The field Name 17b holds the name of the data item. The field PIC 17c is a drop down list box including all valid COBOL PIC domains. The valid COBOL PIC domains include character (X) and integer (9). The adjacent field, PIC Length 17d, includes the corresponding length. The field Description 17e holds a description of the COBOL data item. Also included in the COBOL Data Item Properties window, FIG. 17, are an OK button 17f and a Cancel button 17g. The OK button 17f returns control to the Legacy Data List window, FIG. 14. All changes are saved. The Cancel button 16e also returns control to the Legacy Data List window, FIG. 14, but, changes are not saved. If creating a new data item, the creation is cancelled.

File Browser

Figure 18:
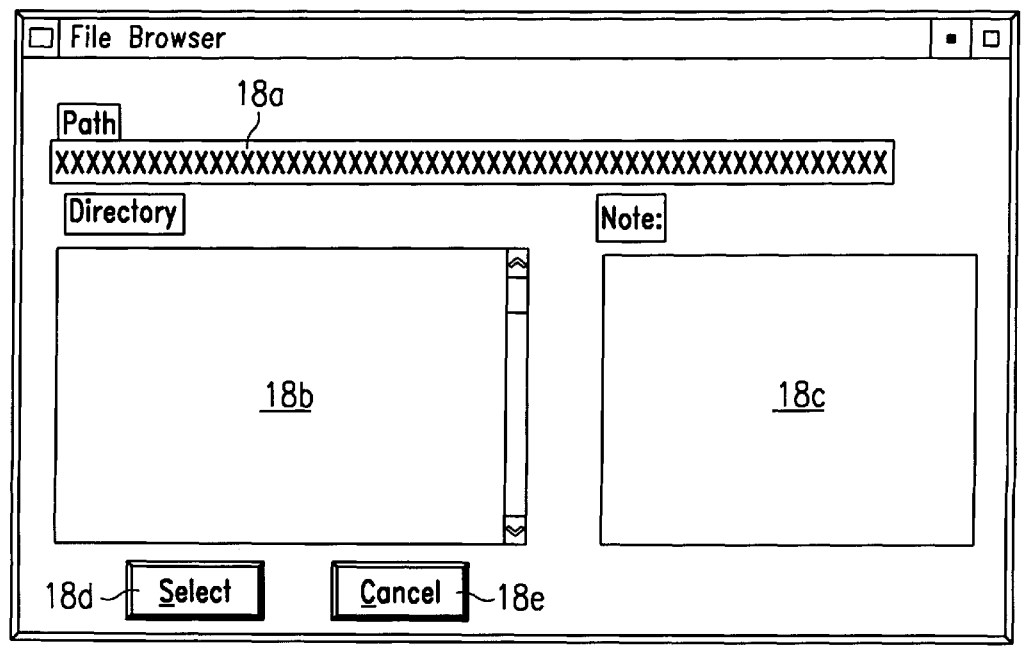
FIG. 18 shows the File Browser window of one embodiment of the user interface of the present invention.

The File Browser window is shown in FIG. 18. This window is used whenever file selections must be made (e. g. when importing source application system data item information). The fields included in the File Browser window in FIG. 18 include Path 18a, Directory 18b and Note 18c. In the field Path 18a, the user may enter the path and/or file name of the file. This field always includes the path currently displayed in the list box of the field Directory 18b. The field Directory 18b is a read only list box which includes the current path's directory listing. The user may select files from this list. Selecting paths (i.e. the user selects a displayed subdirectory) causes the Directory listing to change to that of the new path. The field Note 18c is a read only field which displays messages to the user. For example, if the user is expected to select an input file for IEF data definitions, the message shown in the Note field 18c will so indicate.

The buttons in the File Browser window, FIG. 18, include a Select button 18d and a Cancel button 18e. The Select button 18d passes the selected file back to the caller program. The Cancel button 18e sends a Cancel message back to the calling program to end the function which initiated the file name request.

Error List

Figure 19:
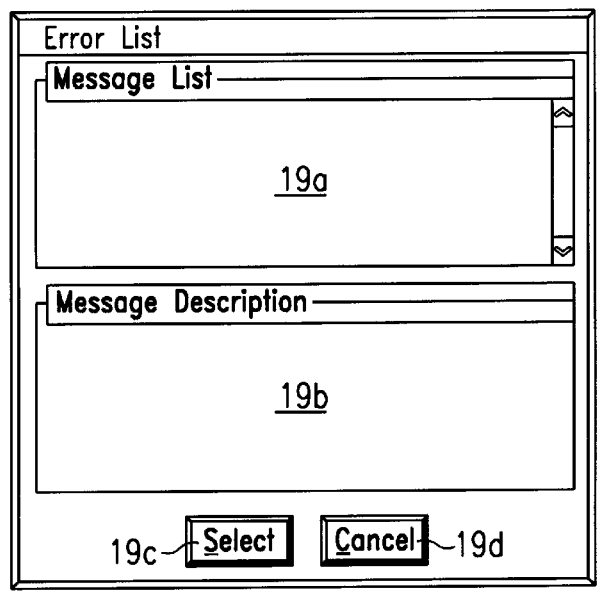
FIG. 19 illustrates the Error List window of one embodiment of the user interface of the present invention.

The Error List window is shown in FIG. 19. This window allows the user to review error messages generated during a statement translation and to begin resolving the problems. The fields included in the Error List window, FIG. 19, are Message List 19a and Message Description 19b. The field Message List 19a is a read only field which displays a list of error messages. The field Message Description 19b is a read only field which shows the entire text for a message selected by the user from the Message List 19a.

The Error List window, FIG. 19, also includes a Select button 19c and a Cancel button 19d. After the user has selected a message in the Message List 19a, i.e. by single clicking the mouse 10, activating the Select button 19c causes a flow to the Error Resolution Options window, FIG. 20, described below. Control also flows to the Error Resolution Options window, FIG. 20, if the user double-clicks the message displayed in the Message List 19a. The Cancel button 19d closes the Error List window, FIG. 19, and returns the user to the COB2AD window, FIG. 5.

Error Resolution Options

Figure 20:
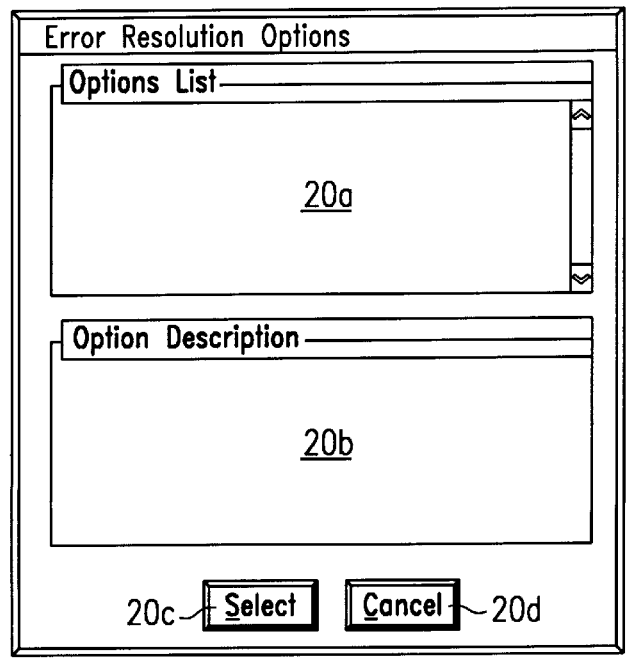
FIG. 20 depicts the Error Resolution Options window of one embodiment of the user interface of the present invention.

The Error Resolution Options window is shown in FIG. 20. This window is only displayed on a flow from the Error List window, FIG. 19. The Error Resolutions Options window, FIG. 20, provides a list of possible solutions for the error message selected on the Error List window, FIG. 19. These options provide a guided approach to aid the user to in resolving ambiguities. For example, a COBOL GOTO statement has no direct correspondence to an IEF statement. However, a COBOL GOTO statement could correspond to the IEF statement ESCAPE, so this is one of the options provided to the user in the Error Resolutions Options window, FIG. 20.

The Error Resolution Options window in FIG. 20 includes the fields Options List 20a and Option Description 20b. The field Options List 20a is a read only field which displays a list of options for resolving the selected error message. The field Option Description 20b is a read only field which shows the entire text for an option displayed in the Options List 20a and selected by the user.

The buttons in the Error Resolution Options window, FIG. 20, include a Select button 20c and a Cancel button 20d. After the user has selected an option displayed in the Options List 20a, i.e., by single clicking the mouse 10, subsequent activation of the Select button 20c implements the selected option. The selected option is also implemented if the user double-clicks a message in the Options List 20a. If all the problems for translating this statement are resolved after implementing the selected option, the translation is completed, the user is returned to the COB2AD window, FIG. 3, and the statement is redisplayed in black type in the COBOL pane 3a. If all the problems are not resolved the statement is still displayed in red type.

The Cancel button 20d closes the Error Resolution Options window, FIG. 20, and return the user to the COB2AD window, FIG. 3.

Diagram List

Figure 22A:
FIGS. 22A–22B show the drop down menus associated with the Diagram List window of FIG. 21 of one embodiment of the user interface of the present invention.
Figure 22B:

The Diagram List window is shown in FIG. 21 and the associated menus, indicated in menu panel 21a, are shown in FIGS. 22A–22B. The Diagram List window, FIG. 21, allows the user to change the Action pane 3b in the COB2AD window, FIG. 3, to display any Action Diagram in Action Diagram List 21c. The user can build multiple Action Diagrams at a single session. These Action Diagrams are not stored persistently, so the user will have to convert them into an IEF model before exiting the COB2AD window, FIG. 3.

The menus in the Diagram List window, FIG. 21, include Edit, illustrated in FIG. 22A, and Detail, illustrated in FIG. 22B. The Edit menu, FIG. 22A, includes the menu items "New" 22a and "Delete" 22b. The menu item "New" 22a allows the user to add Action Diagrams to the Action Diagram List 21c. This option causes a flow to the Diagram Properties window, FIG. 23, described infra. The menu item "Delete" 22b allows the user to delete Action Diagrams from the Action Diagram List 21c.

The Detail menu, FIG. 22B, includes the menu item "Properties" 22c which allows the user to edit the properties for a selected Action Diagram. Selection of this menu item causes a flow to the Diagram Properties window, FIG. 23.

The fields in the Diagram List window, FIG. 21, include Action Diagram Name 21b and Action Diagram List 21c. The field Action Diagram Name 21b allows the user to enter the name of a desired Action Diagram. Alternatively, the user may select a name from the field Action Diagram List 21c. The field Action Diagram List 21c is a read only list box including names of all the Action Diagrams created during the current session.

The buttons selectable on the Diagram List window, FIG. 21, include a Select button 21d and a Cancel button 21e. Activation of the Select button 21d returns the currently selected Action Diagram back to the Action pane 3b of the COB2AD window, FIG. 3. The Cancel button 21e returns the user to the COB2AD window, FIG. 3, leaving the previously displayed Action Diagram in the Action pane 3b. Any changes made by flowing to the Diagram Properties window, FIG. 23, however, will remain.

Diagram Properties

The Diagram Properties window is shown in FIG. 23. This window allows the user to update properties for Action Diagrams. The properties can be changed by the user at any time. The only restriction is that Action Diagram names must be unique. The fields included in the Diagram Properties window, FIG. 23, include Action Diagram Name 23a and Description 23b. The field Action Diagram Name 23a allows the user to edit the name for the Action Diagram. The field Description 23b allows the user to edit the description of the Action Diagram. Also included in the Diagram Properties window, FIG. 23, are an OK button 23c and a Cancel button 23d. The Ok button 23c accepts all changes and returns to the calling program. The Cancel button 23d cancels any changes made and returns to the calling program.

View Maintenance

The View Maintenance window is shown in FIG. 24 and the associated drop down menus, indicated in menu panel 24a, are shown in FIGS. 25A–25D. This window allows the user to edit the view of an Action Diagram. Furthermore, the user can maintain a matching between Action Diagram views and COBOL data items appearing in the COBOL program through the View Maintenance window, FIG. 24. The View Maintenance window, FIG. 24, includes a List Box field 24b which displays the available view lists. The View Maintenance window, FIG. 24, also includes the drop down menus Diagram, Edit, Detail and View.

Figure 25A:
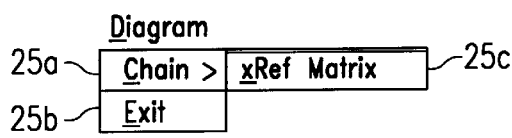
FIGS. 25A–25D depict the drop down menus associated with the View Maintenance window of one embodiment of the user interface of the present invention.

The Diagram drop down menu, illustrated in FIG. 25A, includes menu items "Chain" 25a and "Exit" 25b. The menu item "Chain" 25a allows the user to bring up the Cross Referencing Matrix shown in the xRef Matrix window, FIG. 5. Selection of the menu item "Exit" 25b will return to the calling program.

Figure 25B:
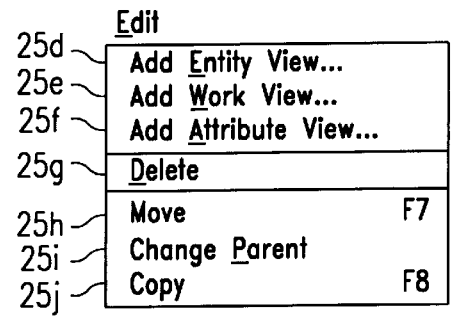

The Edit drop down menu, shown in FIG. 25B, includes the menu items "Add Entity View" 25d, "Add Work View" 25e, "Add Attribute View" 25f, "Delete" 25g, "Move" 25h, "Change Parent" 25i and "Copy" 25j. The menu item "Add Entity View" 25d allows the user to create a new view for a selected Entity Type. The user must have selected a view type (i.e. "Import," "Export," "Local," etc.) using "Go To Import Views" 25o, "Go To Export Views" 25p, "Go To Local Views" 25q or "Go To Entity Action Views" 25r in the View menu shown in FIG. 25D.

The menu item "Add Work View" 25e will create a new view of a Work Set. A Work Set is a data definition used for temporary storage, i.e., not stored persistently to a database. This works the same as the menu item "Add Entity View" 25d. "Add Attribute View" 25f allows the user to add an attribute to an existing view. The user must have selected on an Entity View or Work View object in the list box. "Delete" 25g will delete a selected Entity view, Work view or Attribute view. "Move" 25h allows the user to change the position of a view in the list box. "Copy" 25j allows the user to copy a view definition (i.e. used for copying an Import view to an Export view).

Figure 25C:
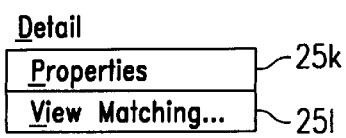

The Detail drop down menu, illustrated in FIG. 25C, includes two menu items "Properties" 25k and "View Matching" 25i. "Properties" 25k causes a flow to the View Properties window, FIG. 26. Selection of the menu item "View Matching" 25i causes a flow to the View Matching window, FIG. 27. This is used for matching views to COBOL data items.

Figure 25D:
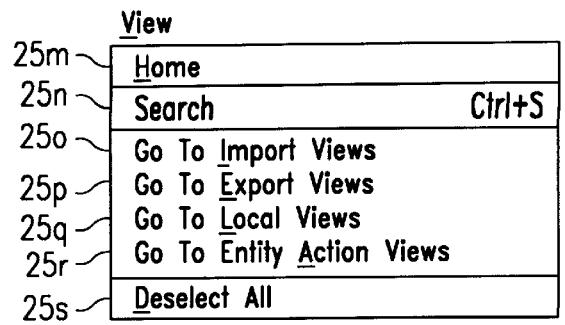

The View drop down menu, shown in FIG. 25D, includes the menu items "Home" 25m, "Search" 25n, "Go To Import Views" 25o, "Go To Export Views" 25p, "Go To Local Views" 25q, "Go To Entity Action Views" 25r and "Deselect All" 25s. The menu item "Home" 25m brings the view in the list box to the top of the view list. "Search" 25n allows the user to search the view list for a matching string. The first match is displayed at the top line of the list box. "Go To Import Views" 25o causes the list box to display from the word "Import"(i.e. list box view begins with the top of the Import view list). The menu items "Go To Export Views" 25p, "Go To Local Views" 25q and "Go To Entity Action Views" 25r works similar to the menu item "Go To Import Views 25o. "Deselect All" 25r will deselect all selected objects in the list box.

View Properties

Figure 26:
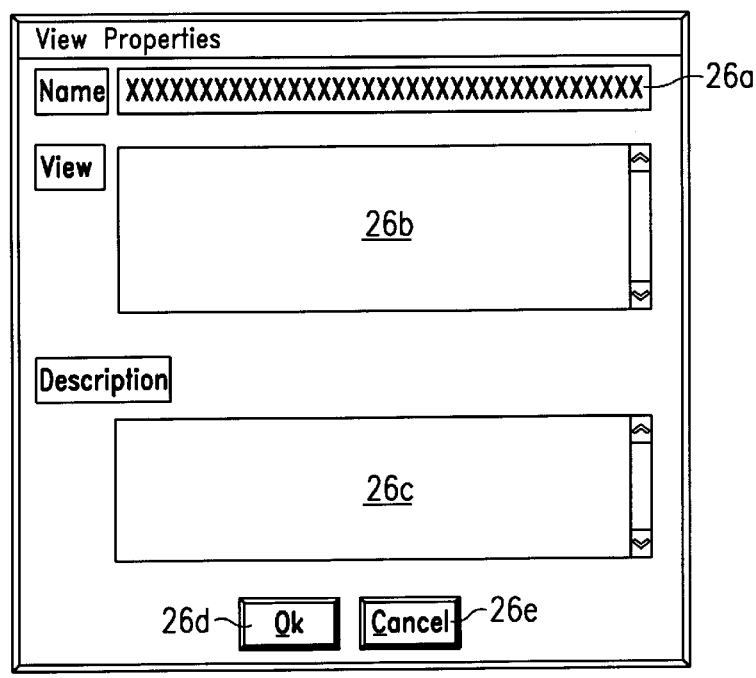
FIG. 26 shows the View Properties window of one embodiment of the user interface of the present invention.

The View Properties window is shown in FIG. 26. This window allows the user to edit the properties for IEF views. The fields on the View Properties window, FIG. 26, include Name 26a, View 26b and Description 26c. The field Name 26a allows the user to enter a name for a View of an Action Diagram. View names must be unique and can be at most 32 characters long. The field View 26b is a read-only list box which displays the view selected from the list in the View Maintenance window. The field Description 26c allows the user to enter a free-form description for the view of up to 1980 characters.

The buttons selectable from the View Properties window include an OK button 26d and a Cancel button 26e. The OK button 26d causes a return back to the View Maintenance window, FIG. 24. All changes made to the view are saved. The Cancel button 26e also causes a return back to the View Maintenance window, FIG. 24, however, any changes made to the view are not saved.

View Matching

Figure 27:
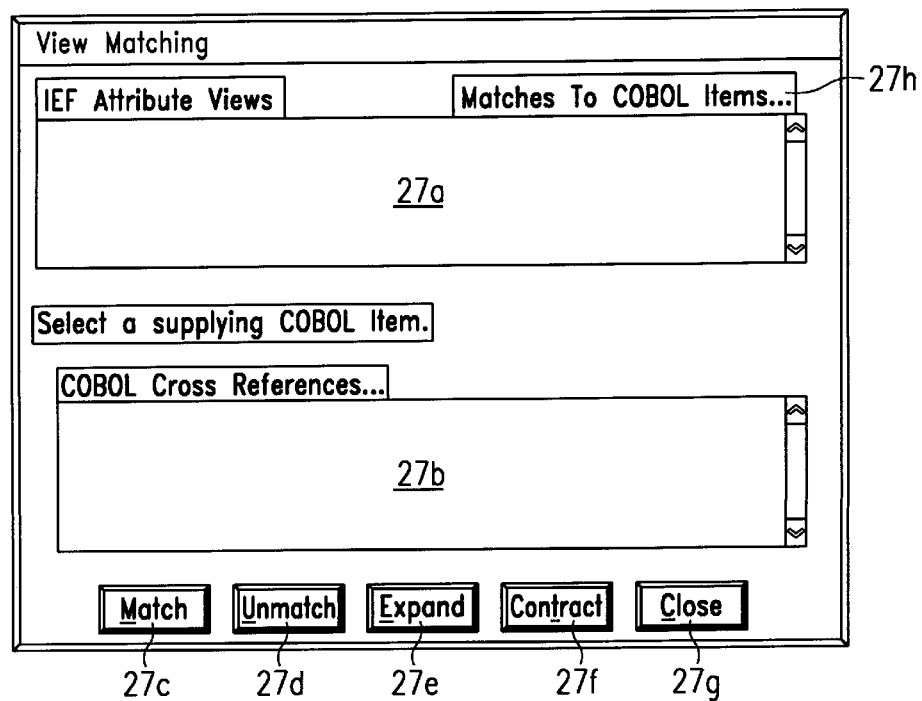
FIG. 27 illustrates the View Matching window of one embodiment of the user interface of the present invention.

The View Matching window is shown in FIG. 27. This window allows the user to create a match between COBOL data items found in the imported COBOL program 9 or entered manually and data item in the IEF Action Diagram Views importing using the Information Repository Output file 35 or entered manually. This matching will control how statement translations occur. Building a match requires that a Cross Reference exists between the IEF Entity/Work Set Attributes and the COBOL Data Items. This Cross Reference is only maintained via the Cross Referencing Matrix in the xRef Matrix window, FIG. 5. The user may specify multiple views as potential targets for a given COBOL data item. This ambiguity is dealt with through the Error Resolution mechanism which includes the Error List window, FIG. 19 and the Error Resolution Options window, FIG. 20. The matching proceeds by building a match between the data items in the source program file 9, COBOL, and data items in the target Information Repository, IEF.

The fields included in the View Matching window, FIG. 27, include IEF Attribute Views 27a and COBOL Cross References 27b. The field IEF Attribute Views 27a is a read only list box which displays the IEF Attribute Views. The Entity/Work Set view must be selected from the View Maintenance window, FIG. 24, prior to matching. The field COBOL Cross References 27b is a read only list box which includes all the COBOL Data Items Cross Referenced to a selected Attribute. This list is only populated after an Attribute is selected in the previous field.

The buttons in the View Matching window include a Match button 27c, an Unmatch button 27d, an Expand button 27e, a Contract button 27f and a Close button 27g. After selecting an Attribute and a Cross Referenced data item, activation of the Match button 27c will create a match. The data item name appears next to the Attributes under the heading "Matches to COBOL Items. . ." shown at 27h. After selecting an Attribute with a match, activation of the Unmatch button 27d deletes the matching. Activation of the Expand button 27e causes any hidden children of a selected item to be displayed. Conversely, activation of the Contract button 27f causes any children of a selected item to be hidden. Activation of the Close button 27g returns the user back to the View Maintenance window, FIG. 24. The current state of the view matching is saved.

Model Properties

Figure 4D:
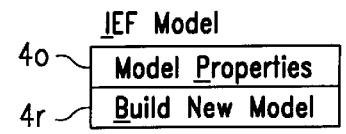
Figure 28:
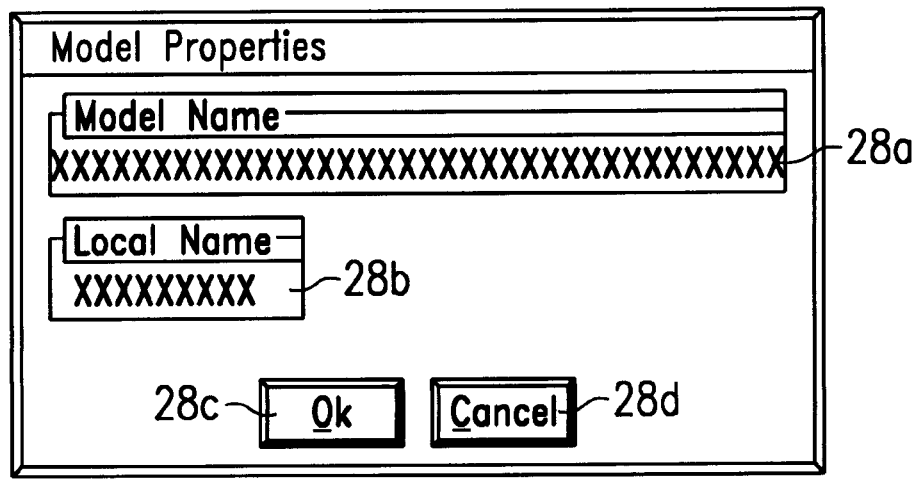
FIG. 28 illustrates the Model Properties window of one embodiment of the user interface of the present invention.

The Model Properties window is shown in FIG. 28. This window allows the user to edit the data model properties. These properties must be defined before the conversion to IEF (selection of the data item "Build New Model" 4r in the menu IEF Model, FIG. 4D, associated with the COB2AD window, FIG. 3) step can begin. Any data model currently residing in the "Local Model" path will be replaced with the new model. The fields included on the Model Properties window, FIG. 28, include Model Name 28a and Local Name 28b. The field Model Name 28a includes the name for the new model. Model names can be at most 32 characters. The field Local Name 28b includes the local name for the new model. Local names can be at most 8 characters and define the path where the new model will reside.

Also included in the Model Properties window, FIG. 28, are an OK button 28c and a Cancel button 28d. Selection of the OK button 28c accepts the changes made by the user and returns to the calling program. Selection of the Cancel button 28d cancels any changes made and returns to the calling program.

Conversion Status

Figure 29:
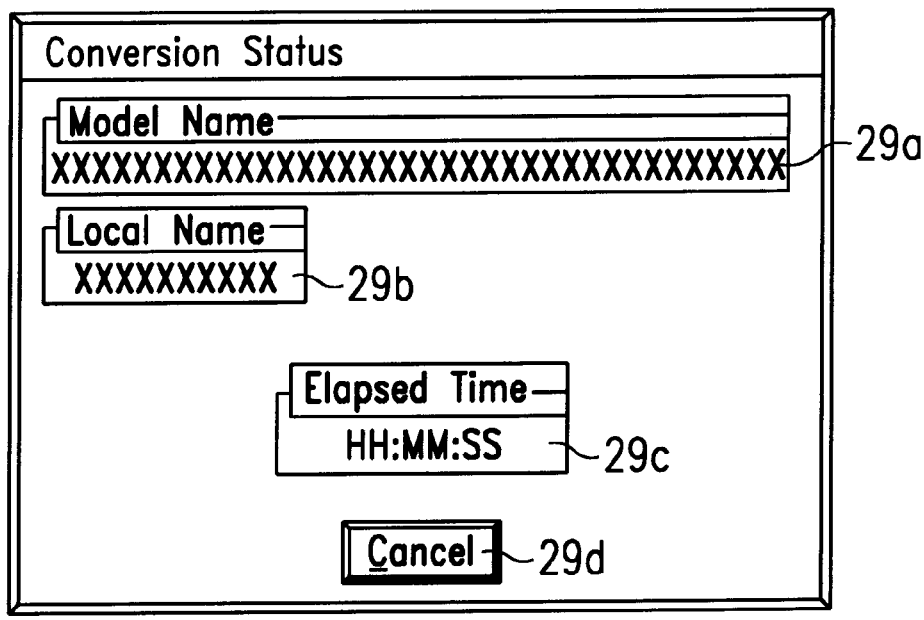
FIG. 29 shows the Conversion Status window of one embodiment of the user interface of the present invention.

The Conversion Status window is shown in FIG. 29. This window appears while the new data model is being built. When completed, the user must import the generated Information Repository Input file 21e into the target Information Repository. The Conversion Status window, FIG. 29, includes the fields Model Name 29a, Local Name 29b and Elapsed Time 29c. The field Model Name 29a is a read only field which shows the name of the model being built. The field Local Name 29b is a read only field which shows the local name of the model being built. The field Elapsed Time 29c is a read only field which shows the amount of time elapsed since the beginning of the conversion process. This time is updated every second. A Cancel button 29d is also included in the Conversion Status window, FIG. 29. If the user activates the Cancel button 29d, the conversion process is halted. This may, however, result in a corrupt data model and an unusable Information Repository Input file 21.

Although the present invention has been described in detail, it should be understood that various changes, substitutions and alterations can be made thereto without departing from the spirit and scope of the present invention as defined by the appended claims.

What is claimed is:

1. A computer implemented method for translating a program on a source application system in a first representation with a first high level language and a first data structure to a second representation with a second high level language and second data structure on a target application system, comprising the steps of:

generating a cross reference between a first set of data items from said source application system and a second set of data items from said target application system; and translating said program in said first representation with a first high level language and a first data structure on said source application system to said second representation with a second high level language and a second data structure on said target application system in accordance with said cross reference.

2. A computer implemented method for translating a program on a source application system in a first representation with a first high level language and first data structure to a second representation with a second high level language and second data structure on a target application system, comprising the steps of:

extracting a first set of data items from said source application system in said first representation with a first high level language and first data structure;

providing a second set of data items from said target application system in said second representation with a second high level language and second data structure;

generating a cross reference between said first set of data items and said second set of data items; and translating said program to said second representation with said second high level language and said second data structure on said target application system in accordance with said cross reference.

3. A computer implemented method for translating a program on a source application system in a first representation to a second representation on a target application system, the computer including a display, comprising the steps of:

extracting a first set of data items from said source application system;

providing a second set of data items from said target application system;

generating a cross reference between said first set of data items and said second set of data items;

parsing portions of said program;

displaying parsed portions of said program on a first area of said display of said computer;

translating a user selected statements from said program to said second representation on said target application system in accordance with said cross reference;

generating error messages in response to errors occurring in said translating step;

flagging one of said user selected statements in said program in response to said generating step;

displaying said error messages and a set of error resolution options on a second area of said display of said computer in response to said user selecting said flagged statement;

executing one of said set of error resolution options in response to said user selecting said one of said set of error resolution options;

repeating said steps of translating, generating, flagging, displaying and executing until no errors occur in said translating step, thereby generating a translation of said user selected statements from said program; and displaying said translation on a third area of said display of said computer.

4. The computer implemented method of claim 3 further including the step of generating a data model for input to an information repository, said data model including said translation of said program and said cross reference.

5. The computer implemented method of claim 3 wherein said extracting step includes the step of extracting said first set of data items from said program.

6. The computer implemented method of claim 3 wherein said extracting step includes the step of accepting user input defining said first set of data items.

7. A computer implemented system for translating a program on a source application system in a first representation to a second representation on a target application system, comprising:

a first input means for receiving a first set of data items from said source application system;

a second input means for receiving a second set of data items from said target application system;

a cross referencing system coupled to said first input means and said second input means for cross referencing said first set of data items to said second set of data items and generating a cross referencing repository in response;

a translator for translating selected portions of said program in said first representation with first high level language and first data structure on said source application system to said second representation with a second high level language and a second data structure on said target application system in accordance with said cross referencing repository; and a user interface coupled between said cross referencing system and said translator for providing user control over said cross referencing system and said translator.

8. A computer implemented system for translating a program on a source application system in a first representation to a second representation on a target application system, comprising:

a first input means for receiving a first set of data items from said source application system;

a second input means for receiving a second set of data items from said target application system;

a cross referencing system coupled and responsive to said first input means and said second input means for cross referencing said first set of data items to said second set of data items and generating a cross referencing repository;

a translator for translating selected portions of said program in said first representation with a first high level language and a first data structure on said source application system to said second representation with a second high level language and a second data structure on said target application system in accordance with said cross referencing repository;

a user interface coupled between said cross referencing system and said translator for providing user control over said cross referencing system and said translator;

a translated procedure administrator coupled to said user interface for providing user access to translated portions of said program; and a data model control coupled to said user interface for building a data model including said translated portions of said program and said cross reference.

9. An automated, interactive translation tool comprising:

means for capturing business rules and data items embedded in source, legacy, application system program in a first high level language;

means for cross referencing said data items in source application system program with data items on a target application system program in a second high level language;

a user interface coupled to said means for cross referencing for providing user control; and means coupled to said user interface for translating the extracted business rules and data items in said source application system program to an equivalent target application system program in a second high level language representation in accordance with the cross reference for input to an Information Repository.

* * * * *

UNITED STATES PATENT AND TRADEMARK OFFICE
CERTIFICATE OF CORRECTION

PATENT NO. : 6,151,702
DATED : November 21, 2000
INVENTOR(S) : James M. Overturf et al.

It is certified that error appears in the above-identified patent and that said Letters Patent is hereby corrected as shown below:

<u>Title page,</u>
Item [73], Assignee, delete "Computer Associates Think, Inc." insert -- Sterling Software, Inc., Islandia, New York and Price Waterhouse, LLP, New York, New York --.

Signed and Sealed this

Twenty-fourth Day of February, 2004

JON W. DUDAS
*Acting Director of the United States Patent and Trademark Office*